United States Patent [19]
Erwin

[11] Patent Number: 5,205,161
[45] Date of Patent: Apr. 27, 1993

[54] FUEL CONSUMPTION MEASUREMENT SYSTEM

[76] Inventor: Curtis L. Erwin, 5805 SE. Gladstone, Portland, Oreg. 97206

[21] Appl. No.: 698,152

[22] Filed: May 10, 1991

Related U.S. Application Data

[63] Continuation-in-part of Ser. No. 627,233, Dec. 14, 1990, abandoned.

[51] Int. Cl.[5] ............................................. G01F 9/02
[52] U.S. Cl. ................................................... 73/114
[58] Field of Search ...................... 73/114, 119 A, 113

[56] References Cited

U.S. PATENT DOCUMENTS

| | | |
|---|---|---|
| 2,713,272 | 7/1955 | Granberg . |
| 3,224,273 | 12/1965 | Granberg .............................. 73/233 |
| 3,425,274 | 2/1969 | Clement et al. .................... 73/229 X |
| 3,549,868 | 12/1970 | Watson et al. .......................... 235/92 |
| 4,073,186 | 2/1978 | Erwin, Jr. ................................ 73/114 |
| 4,079,623 | 3/1973 | Erwin, Jr. ................................ 73/113 |
| 4,085,610 | 4/1978 | Erwin, Jr. ................................ 73/113 |
| 4,479,465 | 10/1984 | Flynn ............................ 73/119 A X |

*Primary Examiner*—Jerry W. Myracle
*Attorney, Agent, or Firm*—Eugene M. Eckelman

[57] ABSTRACT

A fuel measurement instrument and method of monitoring fuel flow. The system is primarily for diesel engines, and is specially designed to measure fuel consumption and interface to host devices such as Marine Global Navigation Systems, On-Board Computer Systems of Off-Highway Mining Vehicles, Class 8 Trucks, Buses, Locomotives, and all other on-board computer systems. A frequency based fuel consumption measuring system arranged for use with an engine or combustion device, in which a portion of the fuel fed thereto is unburned and including a return line arranged to return fuel back to the fuel supply, said measuring system comprising a volumetric flow meter measuring fuel supplied to the combustion device, a temperature sensor measuring the temperature of the fuel supplied to the combustion device, a volumetric flow meter measuring return flow in the return line, a temperature sensor measuring return fuel temperature, an electronic device responsive to the outputs of said two fuel flow meters and said temperature sensors compensating the fuel flow measurements for variations in the temperature of the fuel, further determining an output which comprises the differential of the compensated measurements, an electronic component responsive to the output of the fuel flow differential, and a user programmable adjustment mechanism, capable of customizing the output to various pulse output frequencies, related to fuel flow rate.

31 Claims, 3 Drawing Sheets

FUEL CONSUMPTION MEASUREMENT SYSTEM

This is a continuation-in-part of application Serial No. 627,233, filed Dec. 14, 1990 now abandoned.

BACKGROUND OF THE INVENTION

This invention relates to new and useful improvements in fuel consumption measurements systems for engines and combustion systems which recirculate unburned fuel.

In my prior U. S. Pat. Nos. 4,073,186, 4,079,623 and 4,085,610, I provided novel structure for accurately determining, and ultimately displaying and or recording fuel consumption of an engine or combustion device. These fuel measurement systems were primarily for fuel systems whereby a portion of the fuel fed to the combustion device is unburned and included a return line from the combustion system arranged to recirculate the unburned fuel back to the fuel supply. These prior devices utilized novel measurement techniques, particularly with bidirectional or two meter measurement systems, in determining accurate fuel consumption measurement. The following invention describes important improvements and advantages over my previous measurement devices.

SUMMARY OF THE INVENTION

The primary objective of this invention related to a novel method of accurately monitoring and producing a signal related to fuel consumption for engines and combusion systems which recirculate unburned fuel. It features a bi-directional, volumetric fuel measurement system incorporating two magnetically actuated, positive displacement flow meters for the fuel consumption measurement.

A precision pulse output generating mechanism is coupled with the fuel measurement system described above through a micro-processor type computer. The programmed micro-processor computer is designed to produce a designated frequency of the net fuel consumption measurement of two temperature compensated flow meters. The entire measurement mechanism is compactly situated in minature form and is designed for (OEM) original equipment manufacturers, to interface into their display and/or recording equipment. Many original equipment manufacturers are involved with monitoring, displaying and/or recording a considerable number of engine or combustion device parameters, such as RPM, various pressures and temperatures. One parameter OEM's would like to monitor is fuel consumption, if an accurate and reliable fuel measurement instrument was available that was relatively inexpensive, simple to install on the engine or combustion device, and simple to interface into their host equipment.

With one model of the present invention, the pulse output frequency produced is user selectable, whereby it is possible to select the most desirable rate of flow frequency. For example: one pulse per gallon or liter of consumption; ten pulses per gallon or liter of consumption; 100 pulses per gallon or liter of consumption; 1000 pulses per gallon or liter of consumption; or 10,000 pulses per gallon or liter of consumption. A selectable pulse output of frequency, per unit of fuel, is extremely desirable from a simplicity of manufacturing standpoint and for each individual (OEM) application to offer the ultimate accuracy resolution for each individual user requirement.

A second objective of the invention features a minaturized (OEM) fuel measurement instrument with a simultaneous combination of outputs. Namely, totalized consumption (Gallons or Liters) in one electrical conductor of a multi-conductor wiring harness, rate of consumption (Gallons or Liters per hour) in a second conductor and RPM in a third conductor, all in selectable pulse outputs and/or ASCI formats. For example, an (OEM) may require a fuel measurement instrument with a rate of flow frequency output in 10,000 pulses per liter increments, the totalizer output in single liter increments and a third output of RPM measurement. However, many OEM's require only the rate of flow output, as their host device is capable of integrating the fuel rate measurement into both rate of flow and totalized fuel flow measurements.

A third objective of the invention involves the smoothness of the flow rate output frequency. A novel rate averaging mechanism is designed into the microprocessor software whereby the flow rate output frequency (tachometer output) tracks the engine RPM. This is counter to the flow rate output produced by conventional positive displacement flow meters utilized in a dual flow meter (rate of flow instrument.) The pulse output fluctuate or jitters with flow rate, caused by fuel flow fluctuations of the engine fuel pump. (Positive displacement flow meters inherently have this problem as they do not produce sufficient revolutions or cycles to utilize convential averaging techniques.) It is also counter to other averaging techniques which, when utilized, cause the flow rate indication to lag behind engine RPM. This pulse output averaging technique is termed by the inventor "fixed time averaging".

A forth objective of the present invention features a precision fuel consumption measurement instrument, for combustion systems which return unburned fuel, which is miniature and portable, simple to install and operate, and which is relatively inexpensive to manufacture compared to prior precision devices. The entire fuel consumption measurement system is contained within the two fuel meters themselves.

A fifth objective of the present invention features a user programmable multiplying output of net consumption relating to one, two or more engines being monitored. A second feature of this objective features a user programmable output of average generator flow rate wherein the generator fuel consumption is additive to the engine fuel consumption.

A sixth objective of the present invention features an electronic digital readout display, indicating the compensated flow rate and/or totalized flow, as an integral part of the instrument. The entire, temperature compensated measurement system together with electronic digital readout display is physically contained within the two fuel meters themselves. The electronic instrumentation, located in the supply meter, is cooled via conduction by fuel being supplied to the engine.

A final objective of the present invention features frequency outputs which are distinctly separate and individual in order to offer the OEM user an opportunity to analyze the individual flow rates for diagnostic purposes. (The OEM user then subtracts the two flow rates in his host equipment to obtain net fuel consumption.) In one mode the supply fuel flow rate frequency is output in one electrical conductor while the return flow rate frequency is output in a second electrical conductor. With a second mode, using the same electrical conductor, the supply fuel flow rate frequency is output in one wave length format while the return fuel flow rate frequency is output with a second wave length format.

DETAILED DESCRIPTION OF PREFERRED EMBODIMENTS

Figure 1:
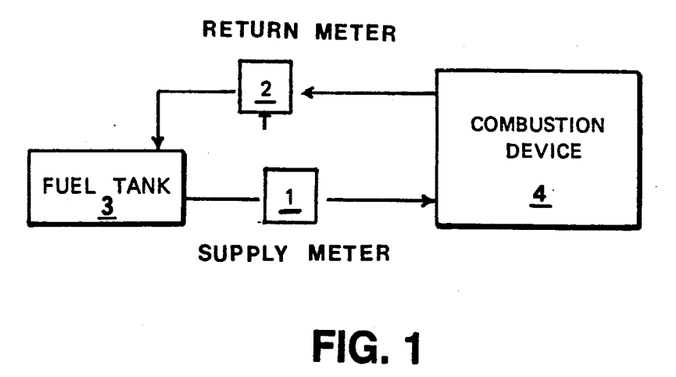
FIG. 1 is a diagrammatic view of the primary fuel measurement system of the invention and which particularly relates to an engine or combustion system which recirculates unburned fuel back to the fuel supply tank.

With particular reference to the diagrammatic view of the basic fuel consumption measurement system illustrated in FIG. 1, an engine or combustion device, of the type which recirculates unburned fuel back to the fuel supply tank, incorporates a fuel meter measuring fuel supplied to the combustion device and a fuel meter measuring fuel returning to the fuel supply tank. The supply meter is designated by the numeral 1 and the return meter by the numeral 2. The fuel supply tank supplying fuel to the combustion system is designated by the numeral 3 and the combustion device by the numeral 4.

Figure 2:
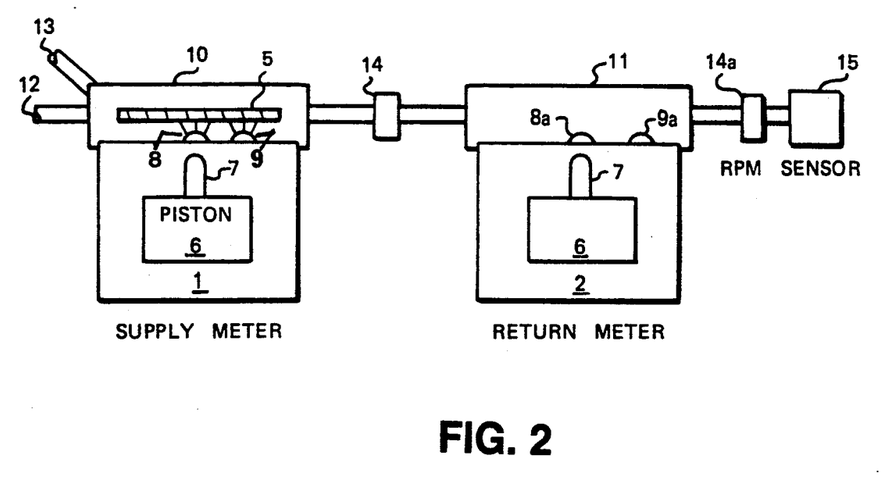
FIG. 2 is a fragmentary diagramatic sectional view of the fuel supply and return meters and the RPM sensor assembly used therewith.

With particular reference to the fragmentary sectional view of the measurement system illustrated in FIG. 2, piston 6 of fuel meter 1 is driven rotationally by the force of fuel flowing to the combustion device 4, by a conventional fuel pump. Magnet 7, of fuel meter 1, is mechanically connected to piston 6. A magnet pickup sensor 8, located outside the fluid measurement chamber of meter 1, but within the magnetic influence of magnet 7, senses rotational movements of piston 6. Pickup sensor 8 is electrically connected to the measurement system computer circuit board 5 which is located in a separate compartment, enclosed by cover cap 10, of the fuel supply meter, fluidically sealed from the piston and magnet assembly. Temperature sensor 9 is capable of sensing fuel temperature of meter 1, and is also electrically connected to the computer circuit board 5. The fuel flow rate signal and fuel temperature measurement of fuel flowing from the combustion device back to the fuel supply through return fuel meter 2 is electrically connected to the computer circuit board 5 via the electrical conduit and connector 14 which separates the the two meters. The fuel sensor 8a and temperature sensor 9a of return meter 2 are also fluidically sealed from the measurement chamber and enclosed by return meter cover cap 11. External power is supplied to the computer circuit board 5, located in the supply meter 1, through electrical conduit 13. A fuel flow signal, related to net fuel consumption, has the capability of being transmitted from the supply meter 1 through an opto-coupled device, later to be described, through conduit 12. A signal measuring the RPM of the engine or combustion device is obtained from the RPM sensor pickup assembly 15 which is connected to return meter 2 thru electrical conduit and connector 14a.

Figure 3:
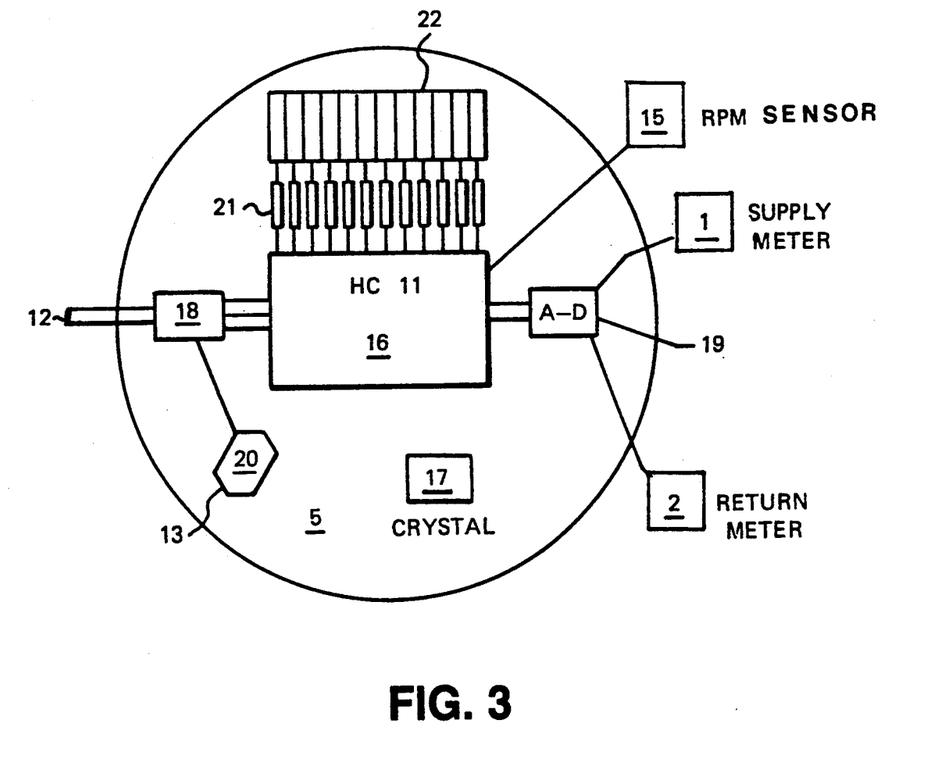
FIG. 3 is a diagrammatic view of the fuel measurement systems primary printed circuit board together with the principal components located thereon.

With reference to the diagrammatic view of FIG. 3, a high powered fuel measurement system computer, housed and entirely contained within the fuel measuring device themselves, is designed and programmed to interface with the supply and return fuel meters described in FIG. 1 and and FIG. 2. The computer circuit board 5 is minaturized and designed to be located in a separate compartment of the fuel supply meter 1, isolated from the fluidic measurement portion of the meter. Computer circuit board 5 incorporates a micro-processor computer chip, of Motorola Corporation's Model HC 11 design family, which is the principle electronic component of the invention and is designate by the numeral 16. Power is supplied to circuit board 5, from an external source through electrical conduit 13, to the power regulation circuitry 20 located on circuit board 5, then to the micro-processor chip 16 and supporting hardware. Forming a part of the invention is an electrical connection from the fuel flow sensor 8 of meter 1 to the processor chip 16 furnishing the computer micro-processor with the data related to flow rate of fuel supplied to the engine or combustion device. Additionally, an electrical connection from sensor 8a of return to the processor chip 16 furnishes the computer chip 16 flow rate data related to the fuel returning from the combustion device back to the fuel supply tank. Fuel temperature information from the temperature sensor 9 of the fuel supply meter 1 is transmitted to an analog to digital convertor 19, of standard electronic manufacture, located on circuit board 5, for conversion of the data from an analog format to a digital format. Fuel temperature information from the temperature sensor 9a of the fuel return meter 2 is transmitted thru a second channel of the analog to digital converter 19 located on circuit board 5, for conversion of the data from an angle format to digital format. Digital fuel temperature data relating to both supply meter 1 and return meter 2 is then transmitted from the analog to digital convertor 19 to separate channels of the micro-processor chip 16 for temperature compensation of fuel flowing thru fuel supply meter 1 and fuel return meter 2. A precision eight mega-hertz crystal, for example manufactured by the Saronix Corporation, designated by the numeral 17, is interfaced to the processor computing chip 16 which allows the processor access to a substantial quantity of precision logic pulses for mathematical computations related to fuel flow rate. Also forming a part of the present invention is a twelve position rocker type dip switch 22, of standard electronic manufacture, which is interfaced to the micro-processor computing chip 16 through a series of resistors 21, allowing for an independent combination of switch selections.

Micro-processor chip 16, with data received from crystal 17 and fuel flow sensors 8 and 9 of meter 1 and flow sensors 8a and 9a of meter 2, has been designed and programmed to determine and produce a digital data stream output of the net temperature compensated measurement of both fuel flow meters. More simply stated, the data stream output produced is a digital resultant of the temperature compensated measurement of return meter 2 subtracted from the temperature compensated measurement of supply meter 1.

Fuel measurement equipment producing a digital output of net fuel consumption has had limited use in past OEM applications because the monitoring equipment has been bulky, separate and remote from the measuring devices themselves, and the data generally unacceptable, from an accuracy and reliability standpoint, for the average OEM user. In addition, the equipment has been excessively costly for OEM applications. The present invention is contained completely within the flow meters themselves, with the flow rate data transmitted in a sensible frequency format. It is simple to interface by OEM engineers, and operates with a minimum degree of external hardware and/or electronics.

Micro-processor 16 of the present invention, interfaced to the fuel flow and temperature data from meters 1 and 2 and crystal 17, has been designed and programmed to produce an output of the net resultant of fuel consumption in a combination of precise frequencies related to flow rate.

Although volumetric positive displacement flow meters, are manufactured to some obscure calibration value, such as 427.67 revolutions per gallon, the electronic interface obstacles associated with these obscure values has been overcome by the present invention. The interface obstacles are compounded even more so, when two positive displacement flow meters are combined in a dual meter measurement system application.

The described invention, overcoming the aforementioned obstacles, presents the OEM user with a usable digital measurement of fuel consumption in an output frequency format, generally many times in excess of the capability of the measuring equipment. With the use of the twelve position dip switch means 22, connected to the processor chip 16 thru the series network of resistors 21 the operator may, at his election, select a frequency of his choice. The selections available are in quantities of ten, for example: 1, 10, 100, 1000 and 10,000 pulses per gallon. Other switch selections of dip switch means 22, convert the output frequency, described above, from gallons to liters or to any other units of measurement calibration.

In marine applications, it is desirable to monitor fuel consumption of the entire vessel, regardless of the number of engines. Utilizing the the frequency output, of the described two meter measurement device, coupled with the multiple position dip switch means 22, the operator can monitor the entire vessel's fuel consumption. With appropriate switch selection of dip switch means 22, the operator can multiply the frequency output, obtained from a single engine metering system, by the number of engines on the vessel. Another set of switch selections, of dip switch means 22, allows the operator to input, additively, into the frequency output an average flow rate of the vessel's generator fuel consumption. Thus, with appropriate switch selections of dip switch means 22, the operator has a fuel consumption measurement, in a usable format, of all the main engines on the vessel as well as the vessel generators, from a single fuel measurement device.

A serious problem with the unit designed for OEM applications had to be overcome, particularly with a dual meter application, with the flow measurement output produced. The frequency produced fluctuate or jitters with flow rate, caused by fuel flow fluctuations of the engine fuel pump. Positive displacement flow meters inherently have this problem as they do not produce sufficient revolutions or cycles per unit of fuel to utilize conventional mathematical pulse averaging techniques. In addition, conventional mathematical pulse averaging techniques, designed to overcome the frequency fluctuating condition, creates a flow rate lagging condition which when utilized causes the flow rate to lag behind the engine RPM. To counteract this condition, a novel pulse averaging technique has been employed and programmed into the measurement system, whereby the flow rate tracks the engine RPM and the fluctuations or jitter has been substantially reduced or eliminated from the frequency output measurement. This type of mathematical averaging is labeled "fixed time averaging" whereby the pulse averaging is employed to the greatest degree when the flow rate is maximum and reduces proportionately to zero when flow rate becomes a minimum. The fixed time frame of averaging presently being employed is 1.8 seconds, however other time frames may be employed.

Figure 4:
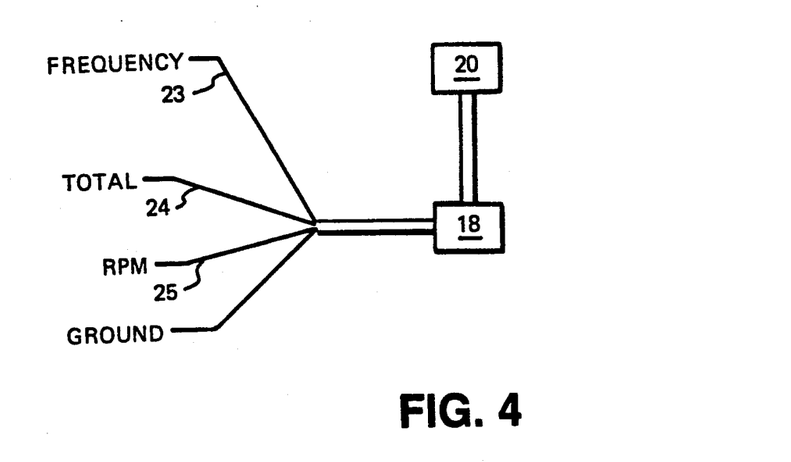
FIG. 4 is a plan view of an optical couplar assembly together with the output conduit and signal connectors.

With reference to the plan view illustrated in FIG. 4, an optical couplar device 18, is furnished the output frequency and other measurements related to fuel consumption from micro-processor chip 16. The purpose of the opto-couplar device, which is of standard electronic manufacture, is to give the OEM user a measurement device which is optically protected from direct electrical connection, thereby ensuring the user against electrical malfunctions caused by improper installation. Outputs of frequency, from opto-couplar device 18 through electrical conduit 12 are designated by the numeral 23, total consumption by the numeral 24, and RPM by the numeral 25. Ground is designated by the numeral 26. Power is input to the opto couplar device from the power regulation device 20. The OEM user merely connects his host equipment to connector 23 and ground 26 of conduit 12 if he desires an output of fuel consumption frequency, connector 24 and ground 26 of conduit 12 for a desired output of totalization consumption, and connector 25 and ground 26 of conduit 12 for an output of RPM. Combinations of any of the three outputs, rate, total and RPM, through their respective connectors from micro-processors 16 can also be optocoupled for any given OEM application.

Figure 6:
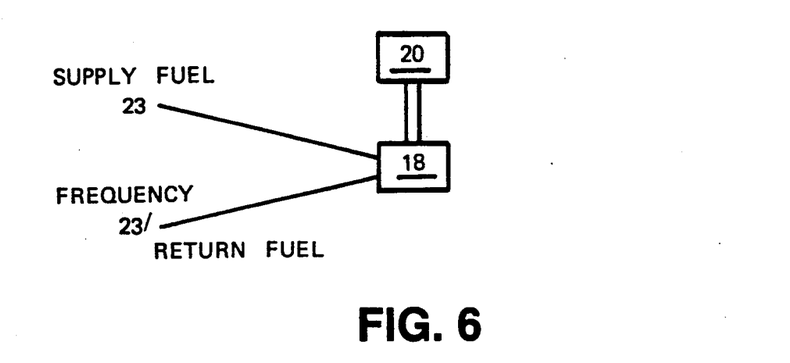
FIG. 6 is a diagramatic view of an optical couplar assembly together with the electrical wiring necessary for individual and separate frequency outputs of supply and return fuel frequency.

Certain OEM's may prefer an alternate form of the invention. They may wish to examine the supply fuel flow rate as well as return fuel flow rate prior to the mathematical computation of net fuel consumption in order to analyze certain engine diagnostics. Net fuel consumption is obtained latter by mathematical computation by the host device. This objective can be accomplished by supplying the OEM a separate designated, temperature compensated frequency, related to the fuel supplied to the combustion means, and a separate designated, temperature compensated frequency related to return fuel. One technique to accomplish this result is with separate electrical conductors as illustrated in FIG. 6, whereby conductor 23 is the supply frequency and conductor 23' is the return frequency, both from the opto-couplar device 18. A second alternative will accomplish this objective in the same electrical conductor 23, by outputting the supply fuel frequency in one wave length format and the return fuel frequency in a second wave length format, both wave length formats of convential electronic design.

Figure 5:
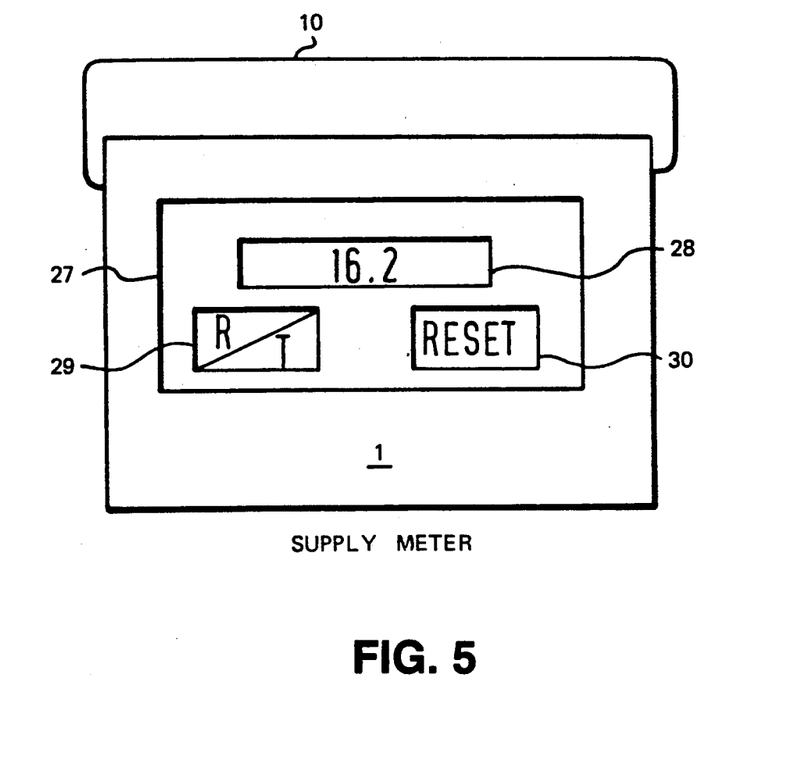
FIG. 5 is a frontal view of the supply meter together with an electronic readout display with rate and/or totalizing capability, mechanically and electronically attached and interfaced to the metering device and electronic instrumentation.

With reference to the diagramatic view illustrated in FIG. 5, an electronic readout device 28 is physically attached and electronically interfaced to the fuel supply meter, designated numeral 1. The preferred example shown is a backlite LCD display 28, located in enclosure 27 integrally connected to and part of the meter housing. The display 28, is of conventional electronic construction consisting of an eight digit liquid crystal type display. The electronic drivers of the LCD display are interfaced directly, through select switch 28, to appropriate conductors of the opto-couplar device 18, to produce either rate of flow or totalized flow measurement, and/or rate of flow only to selectively produce rate of flow and totalized flow indication. Thus, with the use of select switch 29, located adjacent to the display 28, on the face of the display enclosure 27, the operator can toggle the readout back and forth between rate of flow in one mode and totalized flow in a second mode. A third mode, indicating RPM, may be employed, if desired, utilizing select switch 29. A lithium battery is connected into the electronic measurement circuitry, via conventional battery backup electronic construction, to prevent loss of totalized data. A reset switch 30 is located on the display face to allow the totalizer to be reset to zero. The switching device 29 may have other select positions than those indicated. The model described here is the preferred example only and it is understood other combinations may be employed without departing from the scope of this invention.

Engines and engine rooms are generally very hot (sometimes in excess of 150 degrees F. when the engine is loaded.) Because of these hostile temperature conditions, electronic instrumentation and electronic readouts, associated with fuel measurement systems, have previously been installed remote of the fuel metering device, in order to prevent failure, due to use of the equipment beyond temperature related specifications. However, the present system has been designed to overcome these adverse conditions. The computerized electronic instrumentation together with the digital electronic readout has been miniturized and designed for installation in a separate cavity within the fuel supply meter, in order to utilize the fuel itself (flowing through the meter) as a conductive cooling agent to cool the electronic measurement package. Because of the uinique design miniturization and utilization of the fuel as a conductive cooling agent, the electronic measurement system, together with electronic readout, can be integrated into one separate and complete package without worry of potentional failure.

It is to be understood that the preferred digital output programmed and produced by micro-processor 16 and opto-coupler device 18 is in a frequency format, however, other digital formats may also be utilized, one of which is a digital ASCI output of flow rate and/or totalized consumption, and/or RPM.

In addition, the digital output produced from programmed micro-processor chip 16 can interface directly with a Digital to Analog convertor, of standard electronic manufacture, permitting the fuel consumption output produced to be in an analog format.

It is also to be understood that the forms of the invention herein shown and described are to be taken as preferred examples of the same and that various changes in the shape, size and arrangement of parts may be resorted to without departing from the spirit of my invention or the scope of the subjoined claims.

Having thus described the invention, I claim:

1. A frequency based fuel consumption measuring system arranged for use with an engine or combustion device having a fuel supply means in which a portion of the fuel fed thereto is unburned and including a return line from the engine arranged to return fuel back to the fuel supply means, said compensated measuring system comprising volumetric measuring means having means for connection in the fuel supply means of an engine and arranged to measure fuel supplied to the engine, temperature sensing means associated with said fuel supply measured means, volumetric measuring means having means for connection in the return line of an engine and arranged to measure return flow in the return line, temperature sensing means associated with said return fuel measuring means, each of said fuel flow measuring means and temperature sensing means having an output, means responsive to said two fuel flow measuring means outputs and at least one of said temperature sensing means outputs compensating the fuel flow measurements for variations in the temperature of the fuel and means determining an output which comprises the differential of the compensated measurements, adjustable means modifying the differential output frequency for various engine calibrations, and means responsive to the output of the modified fuel flow differential producing a single pulse output interface signal related to fuel flow rate.

2. The fuel measurement device of claim 1, whereby the entire measurement means, compensating means and rate of flow pulse output means are contained within the fuel meters themselves.

3. The fuel measurement device of claim 1, whereby the supply fuel measuring means, temperature compensating means for at least one of the fuel measuring means and rate of flow pulse output means are contained within the fuel supply meter.

4. The fuel measurement device of claim 1 together with a rate averaging mechanism described as fixed time averaging.

5. The fuel measurement system of claim 1, together with opto-couplar isolation means opto-isolating the fuel measurement frequency signal from any interfacing system.

6. The fuel measurement system of claim 1, together with an indicating means interfaced with a single pulse output frequency signal, indicating fuel consumption measurement.

7. A multi-engine frequency based fuel consumption measuring system arranged for use with an engine or combustion device having a fuel supply means in which a portion of the fuel fed thereto is unburned and including a return line from the engine arranged to return fuel back to the fuel supply means, said compensated measuring system comprising volumetric measuring means having means for connection in the fuel supply means of an engine and arranged to measure fuel supplied to the engine, temperature sensing means associated with said fuel supply measuring means, volumetric measuring means having means for connection in the return line of an engine and arranges to measure return flow in the return line, temperature sensing means associated with said return fuel measuring means, each of said fuel flow measuring means and temperature sensing means having an output, means responsive to said two fuel flow measuring means outputs and at least one of said temperature sensing means outputs compensating the fuel flow measurements for variations in the temperature of the fuel and means determining an output which comprises the differential of the compensated measurements, multi-engine combined means responsive to at least one differential output means mathematically combining the fuel consumption of at least two engines, and means responsive to the multi-engine combining means producing a single output frequency signal related to fuel consumption flow rate.

8. The fuel measurement device of claim 7 whereby the combined output frequency of fuel consumption can be modified to output a single pulse frequency signal user calibration in different units of measurement.

9. The fuel measurement device of claim 7 whereby the entire fuel measurement means, at least one of said compensating means and pulse output means are contained within the fuel meters themselves.

10. The fuel measurement device of claim 7 together with a rate averaging mechanism described as fixed time base averaging.

11. A fuel consumption measuring system arranged for use with an engine or combustion device having a fuel supply means in which a portion of the fuel fed thereto is unburned and including a return line from the combustion device arranged to return fuel back to the fuel supply means, said measuring system comprising volumetric measuring means having means for connection in the fuel supply means of the combustion means and arranged to measure fuel supplied to the combustion means, temperature sensing means associated with said fuel supply measuring means, volumetric measuring means having means for connection in the return line of the combustion means and arranged to measure return flow in the return line, temperature sensing means associated with said return fuel measuring means, each of said fuel flow measuring means and said temperature sensing means having an output, means associated with said two fuel measuring means outputs and at least one of said temperature sensing means outputs compensating the fuel flow measurements for variations in the temperature of the fuel, means determining an output which comprises the differential of the compensated measurements, adjustable means capable of modifying the differential output for various engine calibrations, and means responsive to the output of the modified differential producing a pulse output frequency related to fuel flow rate, all of said fuel measurement system contained within the fuel meters themselves.

12. The fuel consumption measuring system of claim 11, whereby the adjustable means mathematically multiplies the frequency output by a number of engines.

13. The fuel consumption measuring system of claim 11, whereby the adjustable means mathematically and additively also adjusts the frequency output for one or more fuel consuming devices.

14. The fuel consumption measuring means of claim 11, whereby the adjustable means mathematically adjusts the frequency output for any calibration purpose.

15. A fuel consumption measuring system arranged for use with an engine or combustion device having a fuel supply means in which a portion of the fuel fed thereto is unburned and including a return line from the combustion device arranged to return fuel back to the fuel supply means, said measuring system comprising volumetric measuring means having means for connection in the fuel supply means of the combustion means and arranged to measure fuel supply to the combustion means, temperature sensing means associated with said fuel supply measuring means, volumetric measuring means having means for connection in the return line of the combustion means and arranged to measure return flow in the return line, temperature sensing means associated with said return fuel measuring means, each of said fuel flow measuring means and said temperature sensing means having an output, means associated with said two fuel measuring means outputs and at least one of said temperature sensing means outputs compensating the fuel flow measurement for variations in the temperature of the fuel, means determining an output which comprises the differential of the compensated measurements, adjustable means capable of modifying the differential output frequency for various engine calibrations, means responsive to the output of the fuel flow differential producing a single pulse output interface signal related to fuel flow rate, and indicating means integrally associated with said measuring means indicating at least one of the rate of fuel flow and totalized fuel flow, all of said fuel measurement system contained within the fuel meters themselves.

16. The fuel consumption measuring system of claim 15 whereby the fuel being delivered by the fuel supply means is the cooling means used to cool said measurement system.

17. The fuel consumption measuring system of claim 15 whereby said indicating means is actuated selectively to indicate one of said fuel flow rate and totalized fuel flow.

18. The fuel consumption measuring means of claim 15, including adjustable means capable of modifying the differential output for any calibration purpose.

19. A frequency based fuel consumption measuring system arranged for use with at least one engine or combustion device having a fuel supply means in which a portion of the fuel fed thereto is unburned and including a return line from the combustion device arranged to return fuel back to the fuel supply means, said fuel measuring system comprising volumetric measuring means having means for connection in the fuel supply means and arranged to measure fuel supplied to the combustion means, temperature sensing means associated with said fuel supply measuring means, volumetric measuring means having means for connection in the return line of the combustion means and arranged to measure return fuel, temperature sensing means associated with said return fuel measuring means, each of said fuel flow measuring means and said temperature sensing means having an output, means associated with said two fuel measuring means and said temperature sensing means outputs compensating the fuel flow measurements for variations in the temperature of the fuel, means associated with the output of the temperature compensated supply fuel producing an output frequency related to the compensated rate of flow supplied to the combustion means, and means associated with the output of the temperature compensated return fuel producing an output frequency related to the compensated rate of flow returned from the combustion means, both of the supply fuel rate of flow frequency and the return fuel rate of flow frequency are output separate but in the same electrical conductor, identified by an identifying means.

20. The frequency based fuel measurement system of claim 19, including means located within the measuring system, capable of compensating the output frequency for any purpose.

21. A compensated fuel measuring system arranged for use with at least one engine or combustion device having a fuel supply means and in which a portion of the fuel fed thereto is unburned and including a return line from the engine arranged to return fuel back to the fuel supply means, said compensated measuring system comprising volumetric measuring means having means for connection in the fuel supply means of an engine and arranged to measure fuel supplied to the engine, temperature sensing means associated with said fuel supply measuring means, volumetric measuring means having means for connection in the return line of an engine and arranged to measure return fuel flow in the return line, temperature sensing means associated with said return fuel measuring means, each of said fuel flow measuring means and said temperature sensing means having an output, means responsive to said two fuel flow measuring means outputs and at least one of said temperature sensing means outputs compensating the fuel flow measurements for variations in the temperature of the fuel, means determining an output which comprises the differential of the compensated measurements, identifying means identifying two different flow rate signals in the same electrical conductor, and an output means outputting the separate flow rate signals.

22. The fuel measuring system of claim 21, whereby the fuel consumption signal of more than one engine can be separately and simultaneously identified by said identifying means.

23. The fuel measurement system of claim 21, together with opto-coupler isolation means, opto-isolating the fuel measurement signal from any interfacing system.

24. The fuel measurement device of claim 21, together with an indicating means interfaced with a single pulse output signal, indicating fuel consumption measurement.

25. The fuel measurement system of claim 21, whereby more than one engine can be monitored simultaneously, together with an indicating means interfaced with a single pulse output frequency signal, indicating fuel consumption of more than one engine.

26. A fuel consumption measuring system arranged for use with an engine or combustion device having a fuel supply means in which a portion of the fuel fed thereto is unburned and including a return line from the combustion device arranged to return fuel back to the fuel supply means, said measuring system comprising volumetric measuring means having means for connection in the fuel supply means of the combustion means and arranged to measure fuel supplied to the combustion means, temperature sensing means associated with said fuel supply measuring means, volumetric measuring means having means for connection in the return line of the combustion means and arranged to measure return flow in the return line, temperature sensing means associated with said return fuel measuring means, each of said fuel flow measuring means and said temperature sensing means having an output, means associated with said two fuel measuring means outputs and at least one of said temperature sensing means outputs compensating the fuel flow measurements for variations in the temperature of the fuel, means determining an output which comprises the differential of the compensated measurements, means decreasing the magnitude of the differential output frequency per unit time of fuel for simplicity of interfacing with other devices, and means responsive to the output of the modified differential producing a pulse output frequency related to fuel flow rate.

27. A fuel consumption measuring system arranged for use with an engine or combustion device having a fuel supply means in which a portion of the fuel fed thereto is unburned and including a return line from the combustion device arranged to return fuel back to the fuel supply means, said measuring system comprising volumetric measuring means having means for connection in the fuel supply means of the combustion means and arranged to measure fuel supplied to the combustion means, temperature sensing means associated with said fuel supply measuring means, volumetric measuring means having means for connection in the return line of the combustion means and arranged to measure return flow in the return line, temperature sensing means associated with said return fuel measuring means, each of said fuel flow measuring means and said temperature sensing means having an output, means associated with said two fuel measuring means outputs and at least one of said temperature sensing means outputs compensating the fuel flow measurements for variations in the temperature of the fuel, means determining an output which comprises the differential of the compensated measurements, means increasing the magnitude of the differential output frequency per unit of time of fuel for simplicity of interfacing with other devices, and means responsive to the output of the modified differential producing a pulse output frequency related to fuel flow rate.

28. A fuel consumption measuring system arranged for use with an engine or combustion device having a fuel supply means in which a portion of the fuel fed thereto is unburned and including a return line means from the combustion device arranged to return unburned fuel back to the fuel supply means, said measuring system comprising volumetric measuring means having means for connection in the fuel supply means of the combustion means and arranged to measure fuel supplied to the combustion means, volumetric measuring means having means for connection in the return line of the combustion means and arranged to measure return flow in the return line means, each of said fuel flow measuring means having an output, means decreasing the magnitude of the frequency output of the fuel supply flow to a specific numerical value of fuel per unit of time, means decreasing the magnitude of the frequency output of the fuel return flow to a specific numerical value of fuel per unit of time, each of said decreased output frequencies having an output, means associated with each of said decreased fuel measurement frequency outputs determining an output which comprises a resultant differential of the two measurements, differential output means responsive to each of said decreased output frequencies, output means responsive to the differential decreased frequency output producing a single output frequency related to fuel flow rate, adjustment means modifying the single differential output frequency for various engine calibrations and indicating means indicating the modified fuel flow measurements.

29. A fuel consumption measuring system arranged for use with an engine or combustion device having a fuel supply means in which a portion of the fuel fed thereto is unburned and including a return line means from the combustion device arranged to return unburned fuel back to the fuel supply means, said measuring system comprising volumetric measuring means having means for connection in the fuel supply means of the combustion means and arranged to measure fuel supplied to the combustion means, volumetric measuring means having means for connection in the return line of the combustion means and arranged to measure return flow in the return line means, each of said fuel flow measuring means having an output, means increasing the magnitude of the frequency output of the fuel supply flow to a specific numerical value of fuel flow, means increasing the magnitude of the frequency output of the fuel return flow to a specific numerical value of fuel flow, each of said output frequencies having an output, means associated with each of said increased fuel measurement frequency outputs determining an output which comprises a resultant differential of the two measurements, differential output means responsive to each of said increased output frequencies, output means responsive to the increased differential frequency output producing a single output frequency related to fuel flow rate, adjustment means modifying the single differential output frequency for various engine calibrations and indicating means indicating the modified fuel flow measurements.

30. A method of monitoring fuel flow comprising:
a) providing a first stream of fuel for transmission from a fuel source to a zone of use in excess of that which may be used;
b) routing said excess fuel in a second stream for transmission back to said fuel source;
c) determining the measured amount of fuel flowing in said first stream;
d) determining the measured amount of fuel flowing in said second stream;
e) modifying each of the measured amounts of fuel flowing in said first and said second streams to a preselected base value per unit of time;
f) determining a resultant of the differential of the modified measurements of said first stream and said second streams and providing an output of the differential;
g) adjusting the resultant output differential for various calibrations.

31. A method of monitoring fuel flow comprising:
a) providing a first stream of fuel for transmission from a fuel source to a zone of use in excess of that which may be used;
b) routing said excess fuel in a second stream for transmission back to said fuel source;
c) determining the measured amount of fuel flowing in said first stream;
d) determining the measured amount of fuel flowing in said second stream;
e) determining a resultant value of the differential of the measured amounts of fuel flowing in said first stream and said second stream;
f) modifying the differential resultant of the measured amounts to a preselected base value per unit of fuel for ease of interfacing;
g) and adjusting the differential resultant output for various calibrations.

* * * * *